(12) United States Patent
Calder et al.

(10) Patent No.: US 7,484,788 B2
(45) Date of Patent: Feb. 3, 2009

(54) SOLID FOLD TONNEAU SYSTEM

(75) Inventors: Dylan Calder, Dexter, MI (US); Donald G. Wheatley, Ann Arbor, MI (US); Donald Edward Wheatley, Ann Arbor, MI (US)

(73) Assignee: Extang Corporation, Ann Arbor, MI (US)

( * ) Notice: Subject to any disclaimer, the term of this patent is extended or adjusted under 35 U.S.C. 154(b) by 168 days.

(21) Appl. No.: 11/591,414

(22) Filed: Oct. 26, 2006

(65) Prior Publication Data
US 2008/0100088 A1    May 1, 2008

(51) Int. Cl.
*B60P 7/02*    (2006.01)
(52) U.S. Cl. .............................. 296/100.09; 296/100.01; 296/100.06
(58) Field of Classification Search ............ 296/100.01, 296/100.06, 100.07, 100.08, 100.09; 16/50, 16/221, 250
See application file for complete search history.

(56) References Cited

U.S. PATENT DOCUMENTS

| | | | | |
|---|---|---|---|---|
| 4,747,441 A | * | 5/1988 | Apolzer et al. .............. 160/206 |
| 5,087,093 A | * | 2/1992 | Repetti .................... 296/100.09 |
| 5,427,428 A | * | 6/1995 | Ericson et al. ................ 296/98 |
| 5,636,893 A | | 6/1997 | Wheatley et al. |
| 5,931,521 A | * | 8/1999 | Kooiker .................. 296/100.09 |
| 5,961,173 A | * | 10/1999 | Repetti ..................... 296/37.6 |
| 6,059,350 A | * | 5/2000 | Kooiker .................. 296/100.09 |
| 6,176,541 B1 | * | 1/2001 | Hoff ....................... 296/100.09 |
| 6,302,468 B1 | * | 10/2001 | Steadman .............. 296/100.04 |
| 6,565,141 B1 | * | 5/2003 | Steffens et al. ......... 296/100.07 |
| 2005/0029832 A1 | * | 2/2005 | Verduci et al. ......... 296/100.06 |
| 2006/0012211 A1 | * | 1/2006 | Keller ................... 296/100.09 |
| 2007/0035151 A1 | * | 2/2007 | Rusu ..................... 296/100.01 |
| 2007/0108792 A1 | * | 5/2007 | Weldy ................... 296/100.09 |
| 2007/0210609 A1 | * | 9/2007 | Maimin et al. ......... 296/100.09 |

* cited by examiner

*Primary Examiner*—Lori L Lyjak
(74) *Attorney, Agent, or Firm*—Harness, Dickey & Pierce, P.L.C.

(57) ABSTRACT

A tonneau system for a cargo box of a pickup truck having panels and hinge assemblies pivotally coupling the panels is provided. The hinge assemblies can define gutters to collect fluid and guide the fluid away from the cargo box. The hinge assemblies can include covers between pivoting components which can be configured to reduce friction during pivoting. The panels and hinge assemblies can include features to receive excess adhesive material during assembly.

21 Claims, 8 Drawing Sheets

SOLID FOLD TONNEAU SYSTEM

FIELD

The present disclosure generally relates to coverings for pickup trucks, and, more particularly, relates to a hinge assembly and other structural components for use with a foldable tonneau cover system.

BACKGROUND

The statements in this section merely provide background information related to the present disclosure and may not constitute prior art.

Tonneau covers have been used for a number of years to cover the cargo box of pickup trucks against dirt, debris, and other environmental contaminants and to improve the aesthetic quality thereof. In particular, foldable tonneau covers are often desirable in that they may cover the bed of the pickup truck for cargo protection and also may be folded toward the rear of the passenger cabin when not in use. Generally, foldable tonneau covers include a plurality of sections configured to span the cargo box of a pickup truck, a hinge system for coupling adjacent sections, and a latching system for coupling the sections of the tonneau cover to the pickup truck.

Foldable tonneau covers which include solid panels can be desirable, for example, to provide strength and rigidity and for their aesthetic quality. The present disclosure provides improvements in foldable tonneau cover systems generally and, more particularly, improvements in foldable tonneau covers incorporating solid panels.

SUMMARY

A tonneau system for a cargo box of a pickup truck is provided. The tonneau system includes at least a first panel and a second panel extending across the cargo box of the pickup truck and a first hinge assembly pivotally connecting the first and second panels. The first hinge assembly includes a base component having a first edge and a first pivot member fixed to the first panel and pivotally coupled to the base component proximate the first edge. The first pivot member has a first flange and a plurality of inner surfaces defining a first gutter facing and aligned with the first flange. The first flange engages the first edge and forms a first primary seal for inhibiting fluid communication between the base component and the first pivot member. The first gutter collects a fluid which passes the first primary seal and discharges the fluid outside of the cargo box of the pickup truck.

Another tonneau system for a cargo box of a pickup truck is provided. The tonneau system includes at least a first panel and a second panel extending across the cargo box of the pickup truck and a first hinge assembly pivotally connecting the first and second panels. The first hinge assembly includes a base component having a first channel formed therein and a first pivot member fixed to the first panel and having a first cylindrical portion formed therein. The first pivot member pivotally couples the base component with the first cylindrical portion disposed in the first channel. The first pivot member includes a first cover disposed over the first cylindrical portion. The first cover engages the first cylindrical portion so as to rotate with the first cylindrical portion relative to the first channel.

Another tonneau system for a cargo box of a pickup truck is provided. The tonneau system includes at least a first panel and a second panel extending across the cargo box of the pickup truck. At least one of the first panel and the second panel including a top sheet and a bow member fixed to the top sheet. The bow member has a top surface with a plurality of ribs extending therefrom, and the ribs define a plurality of gaps adjacent thereto. The top sheet engages the ribs, and the gaps receive excess adhesive material displaced from an interface of the top sheet and the ribs. The tonneau system also includes a first hinge assembly pivotally connecting the first and second panels.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description of the preferred embodiment is merely exemplary in nature and is in no way intended to limit the disclosure, its application, or uses.

Figure 1:
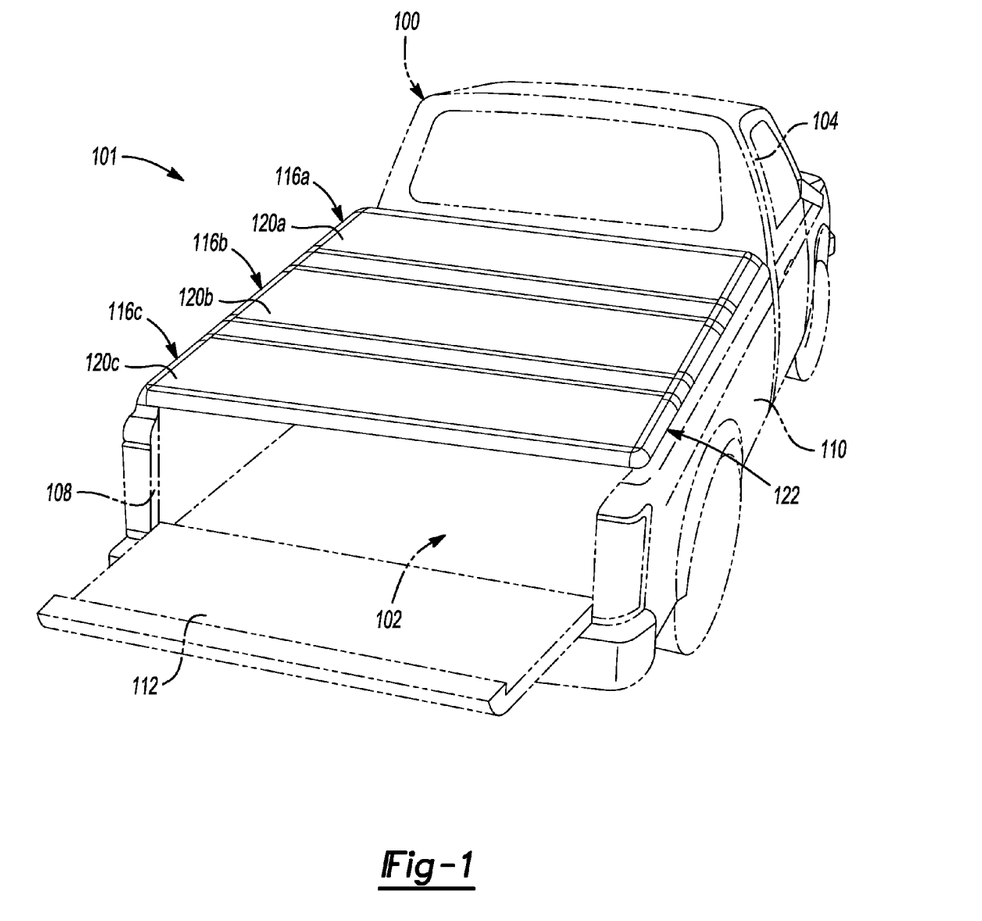
FIG. 1 is a perspective view illustrating a foldable tonneau system according to the principles of the present disclosure in an unfolded configuration extending over a cargo box of a pickup truck.

With reference to FIG. 1, a pickup truck 100 is shown having a foldable tonneau system 101 for use with pickup truck 100. Pickup truck 100 generally includes a cargo box 102 and a passenger cabin 104. Cargo box 102 includes a front wall (not shown), a left sidewall 108, a right sidewall 110, and a rear wall or tailgate 112. It should be understood that right sidewall 110 and left sidewall 108 of pickup truck 100 are identical, yet arranged in mirrored symmetry. Accordingly, in the interest of brevity, only one side will be discussed in detail herein in connection with foldable tonneau system 101 unless noted otherwise.

Figure 2:
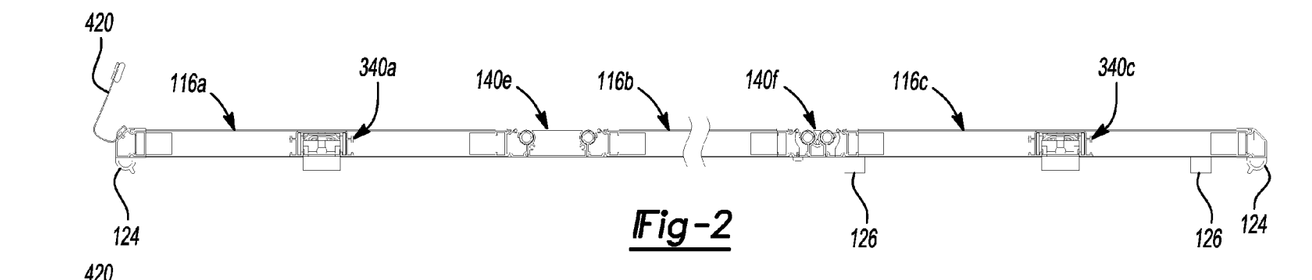
FIG. 2 is a side view illustrating a foldable tonneau system according to the principles of the present disclosure in an unfolded configuration.
Figure 3:
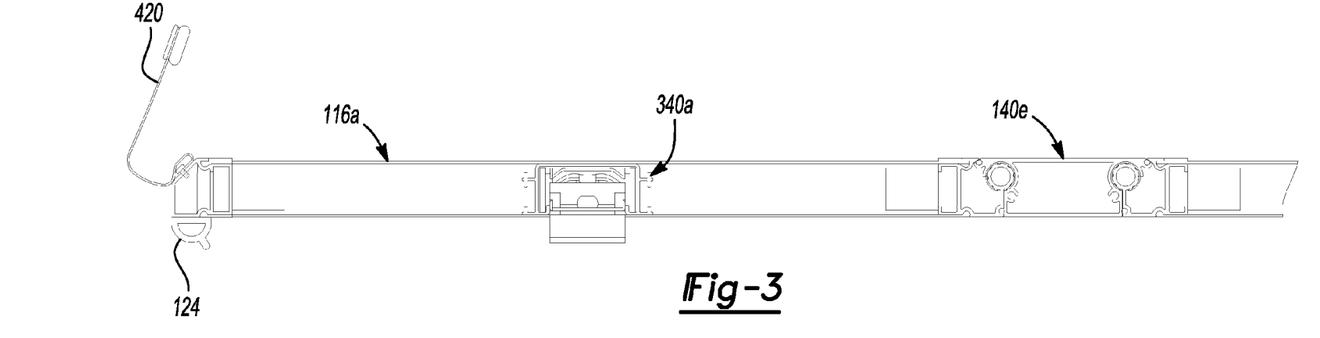
FIG. 3 is an enlarged portion of the side view of the foldable tonneau system of FIG. 2.
Figure 4:
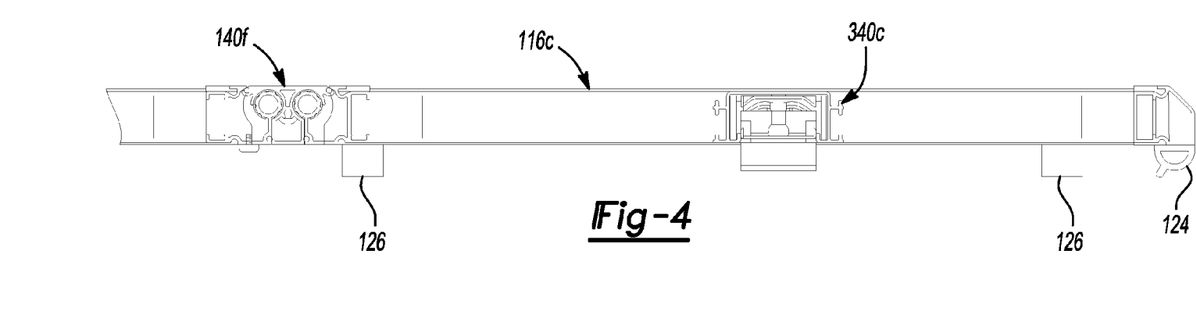
FIG. 4 is another enlarged portion of the side view of the foldable tonneau system of FIG. 2.

With further reference to FIGS. 2-4, foldable tonneau system 101 includes a plurality of tonneau sections 116. It should be understood that the principles of the present disclosure are equally applicable to foldable tonneau systems having two, three, or more sections, each foldable relative to adjacent sections. However, for purposes of this disclosure, a foldable tonneau system having three tonneau sections 116a, 116b, and 116c will be described. This configuration should not be regarded as limiting the claims herein. Tonneau sections 116a-116c may be individually referred to herein as front tonneau section 116a, middle tonneau section 116b, and rear tonneau section 116c, and may be collectively referred to as tonneau sections 116.

Tonneau sections 116 each include a main body 120. These components of tonneau sections 116 may be individually referred to as front main body 120a, middle main body 120b, and rear main body 120c, and may be collectively referred to as main bodies 120. Main bodies 120 will be described in further detail herein.

Foldable tonneau system 101 further includes a frame assembly 122. Frame assembly 122 covers the perimeter of foldable tonneau system 101 and is described in further detail herein. Foldable tonneau system also includes a plurality of sealing components 124 (FIGS. 2-5). Sealing components 124 can be provided in a variety of positions around the perimeter of the bottom side of foldable tonneau system 101 to inhibit fluid communication between foldable tonneau system 101 and pickup truck 100.

Figure 5:
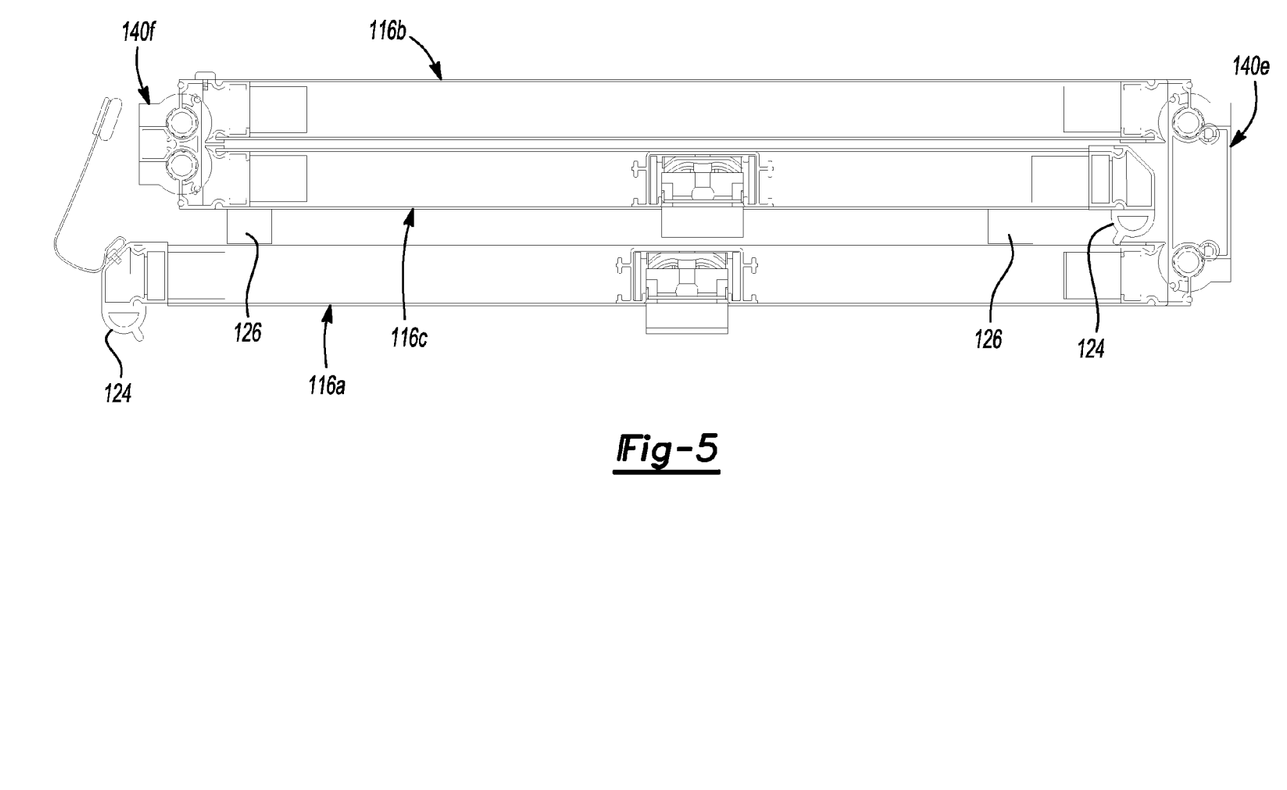
FIG. 5 is a side view illustrating the foldable tonneau system of FIG. 2 in a folded configuration.

FIGS. 1-4 illustrate foldable tonneau system 101 in an unfolded or extended configuration. Referring to FIG. 5, a folded configuration of foldable tonneau system 101 is illustrated. Foldable tonneau system can include spacers 126 to provide support in a folded configuration. The installation of foldable tonneau system 101 on pickup truck 100 and the operation of foldable tonneau system 101 between the unfolded and folded configuration are described in further detail herein.

Hinge Assemblies

Tonneau sections 116 can be pivotably coupled to one another by hinge assemblies 140 (FIGS. 1-5). In particular, front tonneau section 116a and middle tonneau section 116b can be pivotably coupled by a first hinge assembly 140e, and middle tonneau section 116b and rear tonneau section 116c can be pivotably coupled by a second hinge assembly 140f. With reference to FIGS. 6-9, hinge assemblies 140 are illustrated in detail. It should be understood that first and second hinge assemblies 140e, 140f are substantially similar to each other. Accordingly, in the interest of brevity, only one of hinge assemblies 140e, 140f will be discussed in detail in connection with foldable tonneau system 101 unless noted otherwise. Additionally, it should be understood that hinge assemblies 140e, 140f and the components thereof can be collectively described (e.g., as "hinge assemblies 140").

Figure 6:
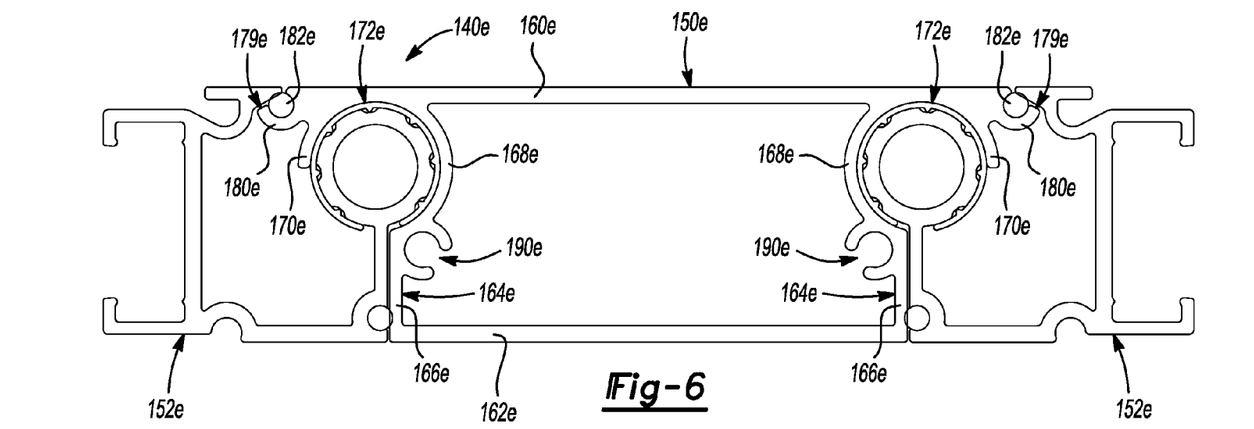
FIG. 6 is a side view illustrating a hinge assembly according to the principles of the present disclosure in an unfolded configuration.

With particular reference to FIG. 6, first hinge assembly 140e is shown in an unfolded or extended configuration, which corresponds to the unfolded configuration of foldable tonneau system 101 (FIGS. 1-4). First hinge assembly 140e includes a base component or base 150e and a pair of pivot members 152e pivotably coupled on opposing sides of base 150e. Base 150e includes a top wall 160e and a bottom wall 162e disposed substantially parallel to top wall 160e. The top wall 160e is wider than bottom wall 162e and bottom wall 162e is disposed so as to be centered relative to top wall 160e. Base 150e further includes a pair of sidewalls 164e extending between top wall 160e and bottom wall 162e proximate the ends of bottom wall 162e. Sidewalls 164e include flat portions 166e proximate bottom wall 162e and curved portions 168e between flat portions 166e and top wall 160e. Base 150e further includes arcuate projections 170e extending from top wall 160e outside of sidewalls 164e and proximate curved portions 168e. Together, curved portions 168e and projections 170e define channels 172e for receiving a portion of pivot members 152e, as is described in further detail herein.

Base 150e further includes a pair of opposing edges 179e of top wall 160e each having a concave portion 180e formed therein. Base 150e further includes first sealing members 182e disposed in concave portions 180e. As is described in further detail herein, when first hinge assembly 140e is in the extended configuration, first sealing members 182e and pivot members 152e engage and fluid communication therebetween is inhibited.

Additionally, base 150e includes boss portions 190e. Boss portions 190e are disposed on inside surfaces of sidewalls 164e. As described in further detail herein, boss portions 190e are configured to receive a fastener therein for securing an end cap to first hinge assembly 140e.

Figure 7:
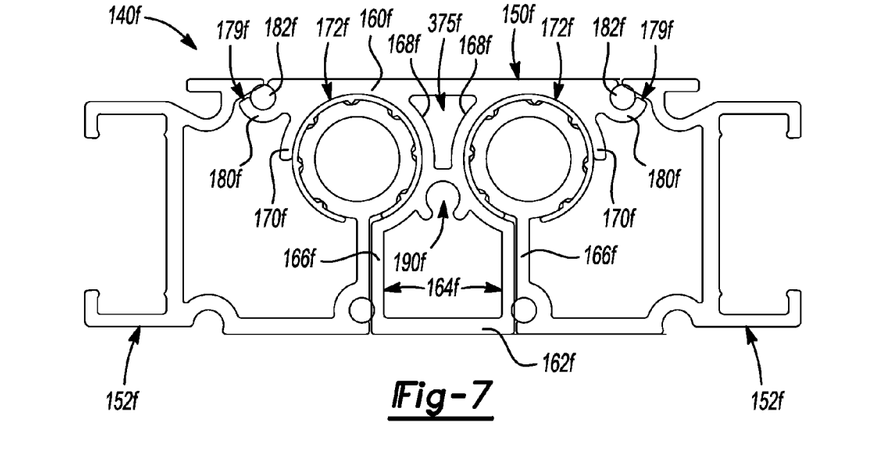
FIG. 7 is a side view illustrating another hinge assembly according to the principles of the present disclosure in an unfolded configuration.

With reference to FIG. 7, second hinge assembly 140f is illustrated in an unfolded or extended configuration. Second hinge assembly 140f is substantially similar to first hinge assembly 140e. However, base 150f is narrower than base 150e, such that pivot members 152f are less spaced apart than pivot members 152e when first hinge assembly 140e is in the extended configuration (FIG. 6). As shown in FIG. 5, the first hinge assembly 140e is wider so that rear tonneau section 116c can be sandwiched between front tonneau section 116a and middle tonneau section 116b when foldable tonneau system 101 is in the folded configuration. Additionally, base 150f includes only a single boss portion 190f. Boss portion 190f extends between the inner surfaces of both of sidewalls 164f.

Figure 8:
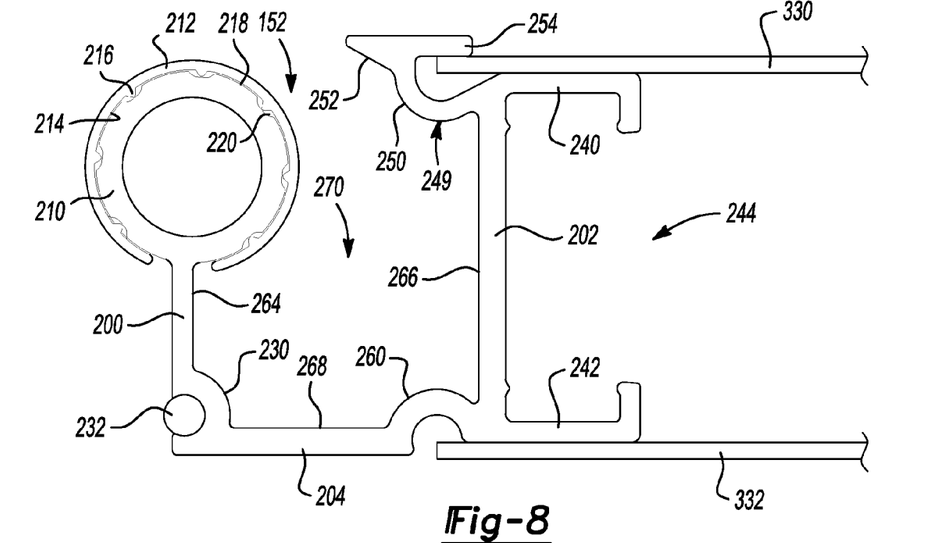
FIG. 8 is a side view illustrating a pivot member of a hinge assembly according to the principles of the present disclosure.

With reference to FIG. 8, an exemplary pivot member 152 will be described in detail. In this exemplary embodiment of foldable tonneau system 101, all of pivot members 152 are the same. As such, it is to be understood that this description applies to each of pivot members 152e, 152f described above with reference to hinge assemblies 140e, 140f.

Pivot member 152 includes a short sidewall 200, a tall sidewall 202, and a bottom wall extending between short sidewall 200 and tall sidewall 202. A cylindrical portion 210 is disposed on an end of the short sidewall 200 opposite bottom wall 204. As shown in FIGS. 6-7, cylindrical portion 210 is configured to be received by channels 172 and rotate therein.

Pivot member 152 can further include a cover 212 over cylindrical portion 210. Cover 212 has an inner surface 214 and projections 216 extending therefrom. Complementary to cover 212, cylindrical portion 210 has an outer surface 218 with grooves 220 defined therein. Projections 216 are positioned on inner surface 214 of cover 212 to correspond with the positioning of grooves 220 on outer surface 218 of cylindrical portion 210. Furthermore, projections 216 are received by grooves 220 to secure or otherwise inhibit relative rotation of cylindrical portion 210 and cover 212. Therefore, cover 212 rotates with cylindrical portion 210 relative to each of channels 172.

Bases 150 and pivot members 152 can each be made of a variety of rigid materials including metals such as aluminum, and bases 150 and pivot members 152 can be the same material. Covers 212 can also be made of a variety of materials and can be a different material than bases 150 and pivot members 152. For example, cover 212 can be made of a material such as plastic. As such, covers 212 can be configured so as to reduce friction between pivot members 152 and bases 150.

With continued reference to FIG. 8, pivot member 152 further includes an outwardly facing concave portion 230 in short sidewall 200 proximate bottom wall 204. Outwardly facing concave portion 230 can be configured to support a second sealing member 232. As shown in FIGS. 6-7, when hinge assemblies 140e, 140f are in extended configurations, second sealing members 232 can engage the outside surface of sidewalls 164 to seal or otherwise inhibit fluid communication therebetween.

Pivot member 152 further includes a top L-shaped projection 240 and a bottom L-shaped projection 242 extending from opposite ends of tall sidewall 202 away from bottom wall 204 and short sidewall 200. Top L-shaped projection 240 and bottom L-shaped projection 242 are oriented to face each other. Together, projections 240, 242 and tall sidewall 202 define a coupling channel 244. As described in further detail herein, coupling channels 244 are configured to engage and support components of frame assembly 122 of foldable tonneau system 101.

Pivot member 152 further includes a flange 249 extending from tall sidewall 202 opposite top L-shaped projection 240. Flange 249 includes an upwardly facing concave feature 250 formed therein, a sloped projection 252 extending towards cylindrical portion 210, and a flat projection 254 extending away from sloped projection 252. As illustrated in FIGS. 6-7, sloped projections 252 are configured to engage first sealing members 182 of bases 150 when hinge assemblies 140 are in the unfolded configurations. Pivot member 152 also includes a downwardly facing concave feature 260 formed between bottom wall 204 and tall sidewall 202. As is described in more detail herein, concave feature 250, flat projection 254, and concave feature 260 are configured to aid the assembly of foldable tonneau system 101.

As described above, with reference to FIGS. 6-7, when hinge assemblies 140 are in the extended configurations, short sidewalls 200 of pivot members 152 extend substantially parallel to flat portions 166 of bases 150. Furthermore, sloped portions 252 of pivot members 152 engage sealing members 182 of bases 150, and sealing members 232 of pivot members 152 engage flat portions 166 of bases 150. As such, fluid communication is prevented between bases 150 and pivot members 152.

With further reference to FIGS. 1-3, top walls 160 of bases 150 define a portion of the top of surface of foldable tonneau system 101. Therefore, the engagement of sealing members 182 and sloped projections 252 is a primary seal between foldable tonneau system 101 and the environment outside of pickup truck 100. It is possible that water or other fluid could bypass this primary seal during operation of foldable tonneau system 101 or due to a failure in the sealed engagement. However, pivot members 152 are configured such that an inside surface 264 of short sidewall 200, an inside surface 266 of tall sidewall 202, and an inside surface 268 of bottom wall 204 combine to define a gutter 270 along hinge assemblies 140 across pickup truck 100. Any fluid which bypasses the primary seal between sealing members 182 and sloped projections 252 will be collected in gutters 270. Furthermore, pivoting members 152 are configured to span across the entire width of cargo box 102 of pickup truck 100. Therefore, fluid can run out the sides of gutters 270 and outside of cargo box 102. Additionally, the engagement between second sealing members 232 and sidewalls 164 provide a secondary seal in hinge assemblies 140.

Figure 9:
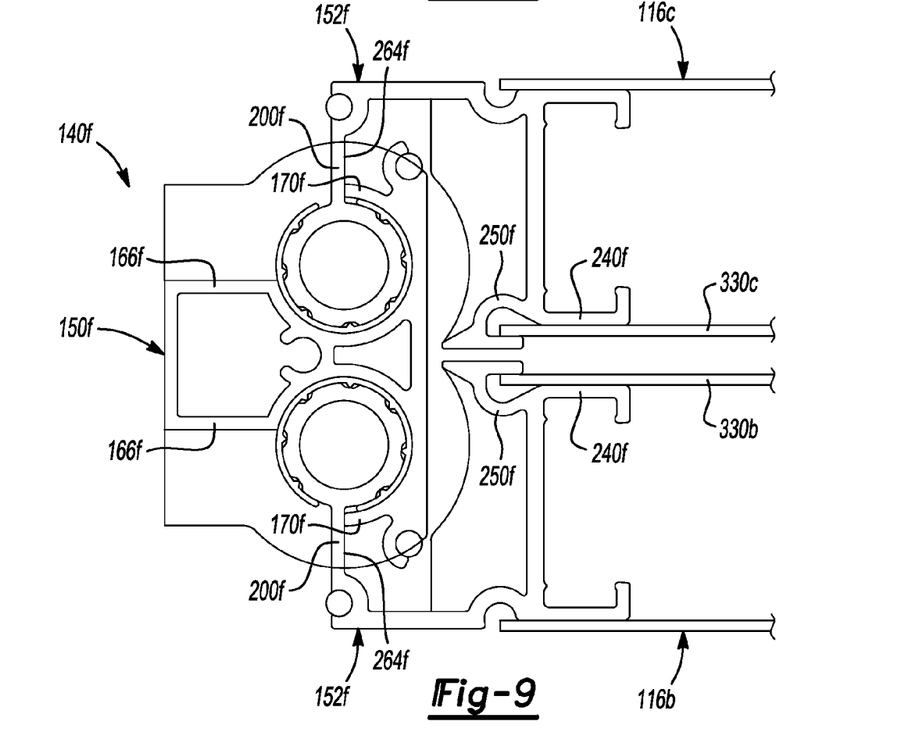
FIG. 9 is a side view illustrating the hinge assembly of FIG. 7 in a folded configuration.

When foldable tonneau system 101 is in the folded configuration (FIG. 5), both of hinge assemblies 140e, 140f are in corresponding folded configurations. With reference to FIG. 9, second hinge assembly 140f is shown in detail in the folded configuration. In particular, FIG. 9 illustrates that pivoting members 152f can rotate approximately 90° relative to base 150f from the unfolded configuration of FIG. 7. For example, in the folded configuration, short sidewalls 200f are oriented substantially perpendicular to flat portions 166f of base 150f. Furthermore, inside surfaces 264f of short sidewalls 200f are engaged with ends of projections 170f of base 150f. This engagement prevents pivot members 152f from being oriented such that tonneau sections 116b and 116c would contact one another. As shown in FIGS. 5 and 9, tonneau sections 116b and 116c extend parallel to each other in this folded configuration. It is to be understood that this description equally applies to the folded configuration of first hinge assembly 140e.

Main Bodies

Figure 10:
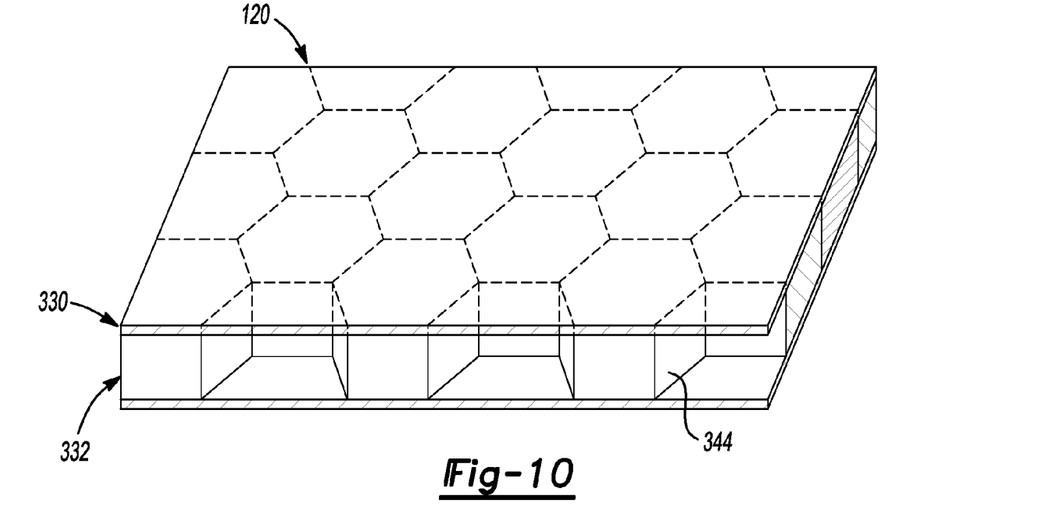
FIG. 10. is a cross sectional view illustrating a portion of a main body of a section of a foldable tonneau system according to the principles of the present disclosure.

Referring again to FIGS. 1-5, each of tonneau sections 116 includes one of main bodies 120. With further reference to FIG. 10, an exemplary portion of one of main bodies 120 is illustrated. Each of main bodies 120 includes a top sheet 330, a bottom sheet 332, and a core 334 sandwiched therebetween. Top sheet 330, bottom sheet 332, and core 334 can be made of relatively rigid materials such as aluminum. Core 334 can have, e.g., a honeycomb design to provide rigidity and strength while limiting weight.

The components of main bodies 120 can be fixed together, e.g., by an adhesive material such as glue. For example, glue can be applied between top and bottom sheets 330, 332 and core 334. With core 334 having, e.g., a honeycomb design, excess glue can be displaced to gaps in core 334. Therefore, top and bottom sheets 330, 332 can each have consistent interfaces with core 334 such that top and bottom sheet 330, 332 can define smooth outer surfaces.

Components of main bodies 120 can also be fixed to hinge assemblies 140, e.g., by an adhesive material such as glue. For example, as shown in FIG. 8, top sheet 330 can extend over a top surface of top L-shaped projection 240 and under flat projection 254 of pivot member 152. Glue can be applied between top sheet 330 and the top surface of top L-shaped projection 240, and excess glue can be displaced into concave feature 250. Similarly, glue can be applied between bottom sheet 332 and a bottom surface of bottom L-shaped projection 242, and excess glue can be displaced into concave feature 260. Therefore, as concave features 250, 260 wick away excess glue from the interfaces of top and bottom sheets 330, 332 and pivot member 152, top and bottom sheets 330, 332 can each have consistent interfaces with pivot member 152 such that top and bottom sheets 330, 332 can define smooth outer surfaces.

As illustrated in FIGS. 2-4, front main body 120a of front tonneau section 116a includes a bow member 340a disposed therein, and rear main body 120c of rear tonneau section 116c includes a bow member 340c disposed therein. Bow members 340a, 340c are disposed within main bodies 120a, 120c in gaps defined bottom sheets 332a, 332c and cores 334a, 334c, respectively, of tonneau sections 116a, 116c. Bow members 340 are configured to house latching assemblies for removably securing foldable tonneau system 101 to pickup truck 100.

Figure 11:
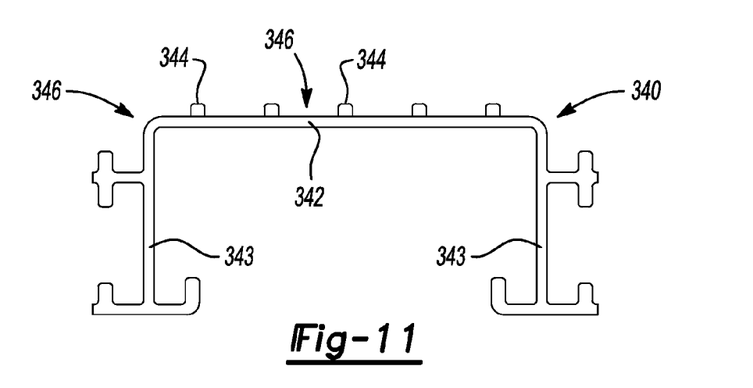
FIG. 11 is a side view of bow member of a foldable tonneau system according to the principles of the present disclosure.

With reference to FIG. 11, an exemplary one of bow members 340 is illustrated in detail. It should be understood that the following description equally applies to each of bow members 340, including bow members 340a, 340c described above. Bow member 340 has a concave shape and includes a top surface 342 with side surfaces 343 extending away from edges of top surface 342. Bow member 340 further includes ribs 344 extending from top surface 342 opposite side surfaces 343. Ribs 344 are spaced apart on top surface 342 so as to define gaps 346 adjacent thereto.

Furthermore, an adhesive material such as glue can also be applied between top sheet 330 and bow member 340. For example, glue can be applied on ribs 344 of bow member 340, and excess glue can be displaced into gaps 346 adjacent to ribs 344. Therefore, top sheet 330 can have a consistent interface with bow member 340 such that top sheet 330 can define a smooth outer surface.

Frame Assembly

Referring again to FIG. 1, foldable tonneau system 101 includes frame assembly 122. Frame assembly 122 includes a plurality of side frame members 362. Side frame members 362 extend along the sides of tonneau sections 116 that are not coupled to one of hinge assemblies 140. As such, front tonneau section 116a and rear tonneau section 116c have three side frame members 362 attached thereto, and middle tonneau section 116b has two side frame members 362 attached thereto.

Figure 12:
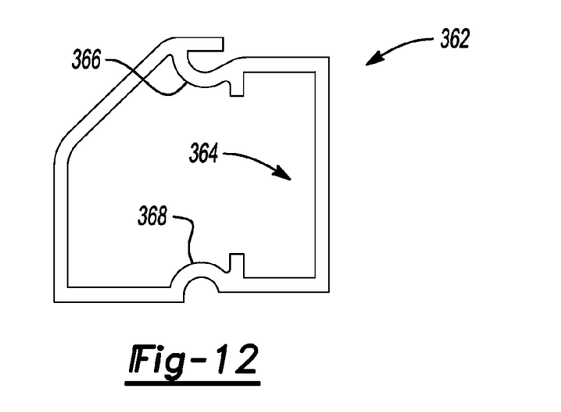
FIG. 12 is a side view of a side frame member of a foldable tonneau system according to the principles of the present disclosure.

With reference to FIG. 12, an exemplary side frame member 362 is illustrated. Similar to pivot members 152, side frame members 362 include a coupling channel 364 configured to engage with other frame components, upwardly facing concave features 366, and downwardly facing concave features 368.

Similar to the corresponding features of pivot members 152, concave features 366, 368 of side frame members 362 are configured to aid the assembly of foldable tonneau system 101. For example, frame assembly 122 and main bodies 120 can be fixed together, e.g., by an adhesive material such as glue. Top and bottom sheets 330, 332 of main bodies 120 can extend over side top and bottom surfaces of side frame members 362, and concave features 366, 368 can function to wick away excess glue from the interfaces of top and bottom sheets 330, 332 and side frame members 362, as is described above with regard to pivot members 152 and concave features 250, 260. Therefore, top and bottom sheets 330, 332 can each have consistent interfaces with side frame members 362 such that top and bottom sheets 330, 332 can define smooth outer surfaces.

Figure 13A:
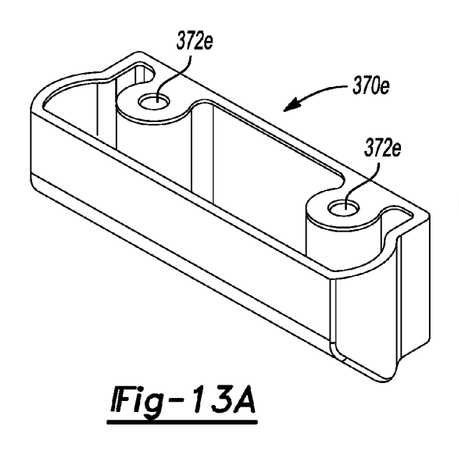
FIGS. 13A-13B are perspective views illustrating an end cap for the hinge assembly of FIG. 6.
Figure 13B:
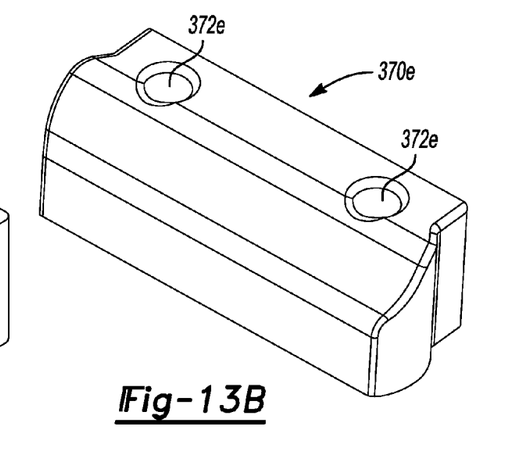

Frame assembly 122 can further include end caps disposed on the ends of hinge assemblies 140. With reference to FIGS. 13A-13B, an exemplary end cap 370e is illustrated. End cap 370e is configured to be fixed at the end of first hinge assembly 140e and includes holes 372e formed therein to receive fasteners (not shown) for attaching end cap 370e to first hinge assembly 140e. Holes 372e are configured to align with bosses 190e of first hinge assembly 140e. The fasteners can extend through holes 372e and threadingly engage bosses 190e to secure end cap 370e and first hinge assembly 140e.

Figure 14A:
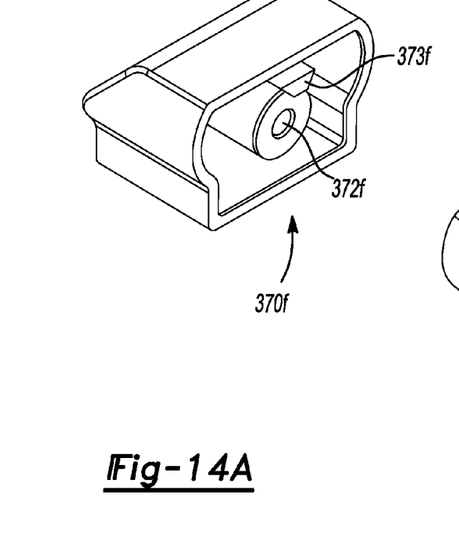
FIGS. 14A-14B are perspective views illustrating an end cap for the hinge assembly of FIG. 7.
Figure 14B:
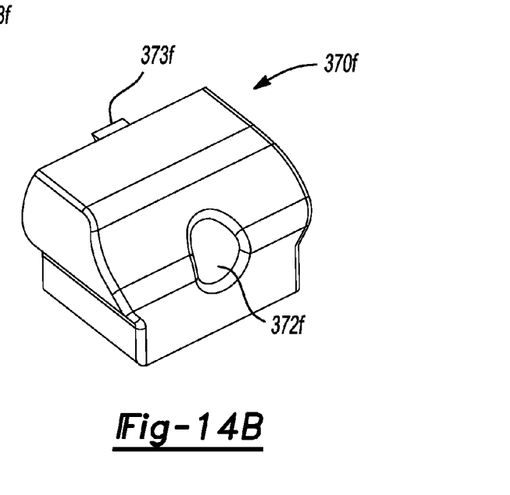

With reference to FIGS. 14A-14B, an exemplary end cap 370f is illustrated. End cap 370f is configured to be fixed at the end of second hinge assembly 140f and includes a single hole 372f that corresponds with the single boss 190f of second hinge assembly 140f. As such, a single fastener (not shown) can secure end cap 370f and second hinge assembly 140f. A projection 373f in end cap 370f projects outward to engage a similarly shaped hollow 375f in base 150f (FIG. 7). This engagement prevents end cap 370f from rotating and allows use of only one fastener. The position of end caps 370 when attached to hinge assemblies 140 is illustrated in FIGS. 5 and 9.

Figures 15, 16, 17:
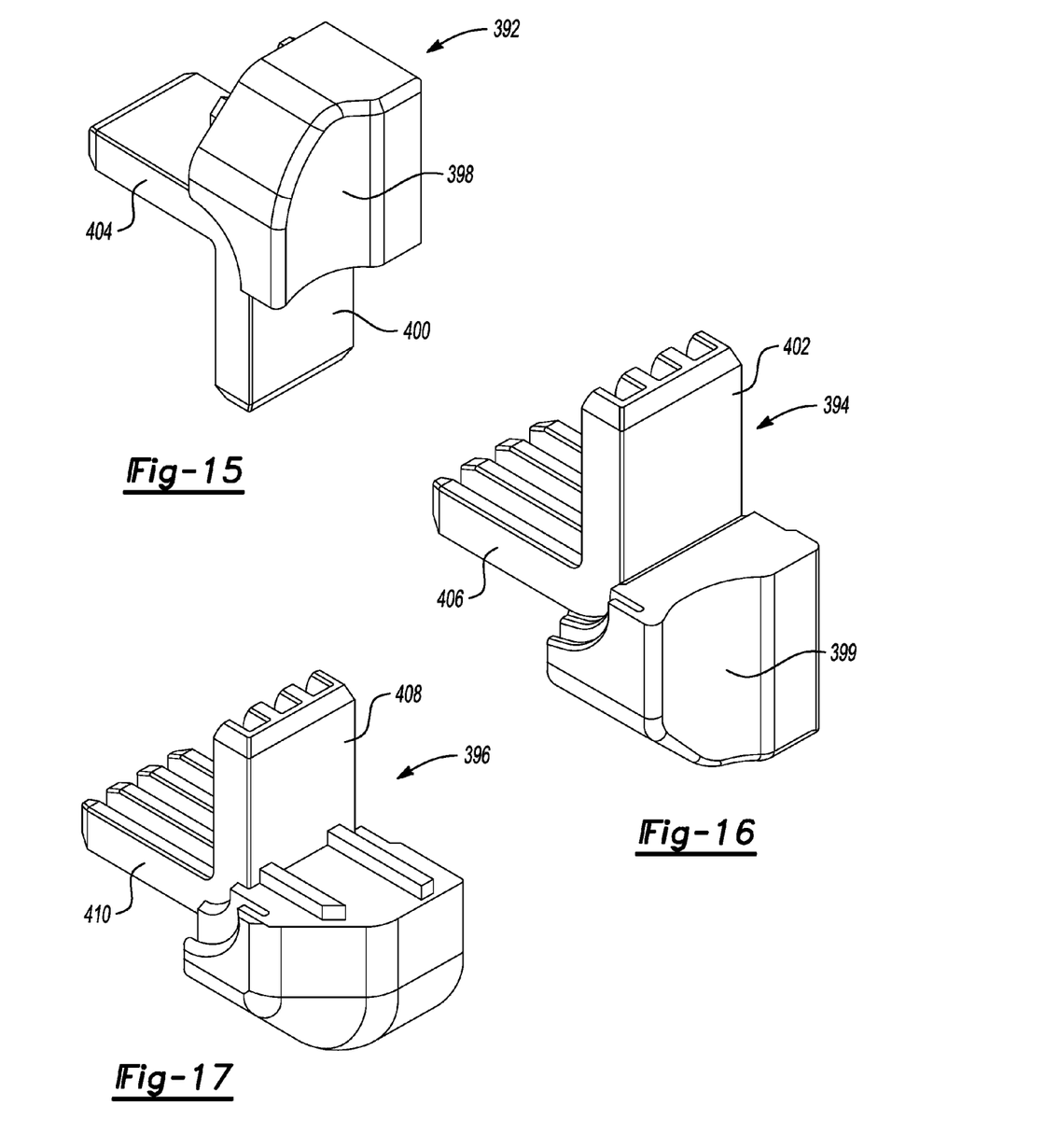
FIG. 15 is a perspective view illustrating a corner component according to the principles of the present disclosure.
FIG. 16 is a perspective view illustrating another corner component according to the principles of the present disclosure.
FIG. 17 is a perspective view illustrating another corner component according to the principles of the present disclosure.

With reference to FIGS. 15-17, frame assembly 122 further includes corner components 392, 394, 396. Corner components 392 and 394 can be disposed between one of side members 362 and one of pivoting members 152. For example, side portions 398, 399 of corner components 392, 394 are curved to correspond with a side of one of end caps 370. Furthermore, first ends 400, 402 of corner components 392, 394 can engage coupling channels 244 of pivot members 152 of hinge assemblies 140 so as to secure each of corner components 392, 394 to one of pivot members 152. Second ends 404, 406 of corner components 392, 394 can engage coupling channels 364 of side frame members 362 so as to secure each of corner components 392, 394 to one of side frame members 362.

Corner component 396 can be disposed between two of side members 362. For example, each of first and second ends 408, 410 of corner component 396 can engage one of coupling channels 364 of side frame members 362 so as to secure corner component 396 to side frame members 362.

Installation

The installation of foldable tonneau system 101 on cargo box 102 of pickup truck 100 will now be described. A foldable tonneau system 101 in the folded configuration is first placed upon sidewalls 108, 110 of cargo box 102 such that side members 362 of front tonneau section 116a are equally positioned upon a top surface of sidewalls 108, 110. Foldable tonneau system can include one or more restraining assemblies 420 (FIGS. 2, 3, and 5) which can be selectively operated to maintain foldable tonneau system 101 in the folded configuration. Therefore, to extend foldable tonneau system 101, restraining assemblies 420 are unlatched to permit the bundled group of middle tonneau section 116b and rear tonneau section 116c to be pivoted about first hinge assembly 140e relative to front tonneau section 116a. Foldable tonneau system 101 is then adjusted to ensure proper positioning of foldable tonneau system 101 on cargo box 102. Front latch assemblies are them slid to outboard positions adjacent a flange of sidewalls 108, 110 by sliding along cross bow member 340a to engage the flange of sidewalls 108, 110 and, thereby, to affect a reliable coupling.

Rear tonneau section 116c is then pivoted about second hinge assembly 140f relative to middle tonneau section 116b to conceal cargo box 102. Rear latch assemblies are then slid to outboard positions adjacent the flange of sidewalls 108, 110 by sliding along cross bow member 340c and positioned to engage the flange of sidewalls 108, 110 and, thereby, to affect a reliable coupling.

To fold foldable tonneau system 101, the rear latch assemblies are disengaged from sidewalls 108, 110 and slid inboard by sliding along cross bow member 340c. Rear tonneau section 116c can be pivoted about second hinge assembly 140f to the folded configuration. Furthermore, the bundled group of rear tonneau section 116c and middle tonneau section 116b can be pivoted about first hinge assembly 140e such that foldable tonneau system 101 is in the folded configuration (FIG. 5). Finally, restraining assemblies 420 can be engaged to serve foldable tonneau system 101 in the folded configuration.

The present disclosure is exemplary and, therefore, can vary in many ways. A foldable tonneau system according to the present disclosure can actually have a variety of members of sections. Furthermore, the sections can include a variety of components and configurations. The components described herein can be made from a variety of materials and can have a variety of configurations. Additionally, the components and sections described herein can be assembled together in a variety of ways.

What is claimed is:

1. A tonneau system for a cargo box of a pickup truck, said tonneau system comprising:
   at least a first panel and a second panel extending across the cargo box of the pickup truck; and
   a first hinge assembly pivotally connecting said first and second panels, said first hinge assembly including:
      a base component having a first edge, and
      a first pivot member fixed to said first panel and pivotally coupled to said base component proximate said first edge, said first pivot member having a first flange and a plurality of inner surfaces defining a first gutter facing and aligned with said first flange, said first flange engaging said first edge and forming a first primary seal for inhibiting fluid communication between said base component and said first pivot member, said first gutter collecting a fluid which passes said first primary seal and discharging the fluid outside of the cargo box of the pickup truck.

2. The tonneau system according to claim 1, wherein said base component further includes a second edge defined opposite said first edge, and
   said first hinge assembly further includes a second pivot member fixed to said second panel, said second pivot member being pivotally coupled to said base component proximate said second edge, said second pivot member having a second flange and a plurality of inner surfaces defining a second gutter facing and aligned with said second flange, said second flange engaging said second edge and forming a second primary seal for inhibiting fluid communication between said base component and said second pivot member, said second gutter collecting a fluid which passes said second primary seal and discharging the fluid outside of the cargo box of the pickup truck.

3. The tonneau system according to claim 2, wherein said base component includes first and second primary sealing members each disposed proximate said first and second edges, respectively, said first and second flanges each directly engaging one of said first and second primary sealing members and forming said first and second primary seals.

4. The tonneau system according to claim 3, wherein said base component includes first and second sidewalls, and
   said first and second pivot members include first and second secondary sealing members, respectively, said first and second secondary sealing members engaging one of said first and second sidewalls and forming first and second secondary seals.

5. The tonneau system according to claim 2, wherein said first panel includes a top sheet, and
   said first pivot member further includes a top surface and a projection extending away from said first flange, said first pivot member including a first concave feature proximate said top surface and said projection, said top sheet of said first panel engaging said top surface and extending in between said top surface and said projection, said first concave feature receiving excess adhesive material displaced from an interface of said top sheet and said top surface.

6. The tonneau system according to claim 5, wherein said first panel further includes a bottom sheet, and
   said first pivot member further includes a bottom surface having a second concave feature defined therein, said bottom sheet of said first panel engaging said bottom surface, said second concave feature receiving excess adhesive material displaced from an interface of said bottom sheet and said bottom surface.

7. The tonneau system according to claim 1, wherein said base component has a first channel formed therein, and
   said first pivot member has a first cylindrical portion formed therein, said first pivot member pivotally coupling said base component with said first cylindrical portion disposed in said first channel, said first pivot member including a first cover disposed over said first cylindrical portion, said first cover engaging said first cylindrical portion so as to rotate with said first cylindrical portion relative to said first channel.

8. The tonneau system according to claim 7, wherein said first cylindrical portion has an outer surface having a plurality of grooves defined therein, said first cover has an inner surface having a plurality of projections extending therefrom, each of said grooves receiving one of said projections so as to engage said first cover and said first cylindrical portion for rotation with one another.

9. The tonneau system according to claim 7, wherein said base component and said first pivot member include aluminum, and said first cover includes plastic.

10. A tonneau system for a cargo box of a pickup truck, said tonneau system comprising:
    at least a first panel and a second panel extending across the cargo box of the pickup truck; and
    a first hinge assembly pivotally connecting said first and second panels, said first hinge assembly including:
       a base component having a first channel formed therein, and
       a first pivot member fixed to said first panel and having a first cylindrical portion formed therein, said first pivot member pivotally coupling said base component with said first cylindrical portion disposed in said first channel, said first pivot member including a first cover disposed over said first cylindrical portion, said first cover engaging said first cylindrical portion so as to rotate with said first cylindrical portion relative to said first channel.

11. The tonneau system according to claim 10, wherein said base component further includes a second channel formed therein, and
    said first hinge assembly further includes a second pivot member fixed to said second panel, said second pivot member having a second cylindrical portion formed therein, said second pivot member pivotally coupling said base component with said second cylindrical portion disposed in said second channel, said second pivot member including a second cover disposed over said second cylindrical portion, said second cover engaging said second cylindrical portion so as to rotate with said second cylindrical portion relative to said second channel.

12. The tonneau system according to claim 10, wherein said base component includes first and second primary sealing members each disposed proximate said first and second channels, respectively, said first and second pivot member each directly engaging one of said first and second primary sealing members and forming first and second primary seals.

13. The tonneau system according to claim 12, wherein said base component includes first and second sidewalls, and said first and second pivot members include first and second secondary sealing members, respectively, said first and second secondary sealing members engaging one of said first and second sidewalls and forming first and second secondary seals.

14. The tonneau system according to claim 10, wherein said first panel includes a top sheet, and said first pivot member further includes a top surface and a projection, said first pivot member including a first concave feature proximate said top surface and said projection, said top sheet of said first panel engaging said top surface and extending in between said top surface and said projection, said first concave feature receiving excess adhesive material displaced from an interface of said top sheet and said top surface.

15. The tonneau system according to claim 14, wherein said first panel further includes a bottom sheet, and said first pivot member further includes a bottom surface having a second concave feature defined therein, said bottom sheet of said first panel engaging said bottom surface, said second concave feature receiving excess adhesive material displaced from an interface of said bottom sheet and said bottom surface.

16. The tonneau system according to claim 10, wherein said base component and said first pivot member include aluminum, and said first cover includes plastic.

17. The tonneau system according to claim 10, wherein said first cylindrical portion has an outer surface having a plurality of grooves defined therein, said first cover has an inner surface having a plurality of projections extending therefrom, each of said grooves receiving one of said projections so as to engage said first cover and said first cylindrical portion for rotation with one another.

18. The tonneau system according to claim 10, wherein said base component further includes a first edge proximate said first channel, and said first pivot member has a first flange and a plurality of inner surfaces defining a first gutter facing and aligned with said first flange, said first flange engaging said first edge and forming a first primary seal for inhibiting fluid communication between said base component and said first pivot member, said first gutter collecting a fluid which passes said first primary seal and discharging the fluid outside of the cargo box of the pickup truck.

19. A tonneau system for a cargo box of a pickup truck, said tonneau system comprising:

at least a first panel and a second panel extending across the cargo box of the pickup truck, at least one of said first panel and said second panel including a top sheet and a bow member fixed to said top sheet, said bow member having a top surface with a plurality of ribs extending therefrom, said ribs defining a plurality of gaps adjacent thereto, said top sheet engaging said ribs, said gaps receiving excess adhesive material displaced from an interface of said top sheet and said ribs; and a first hinge assembly pivotally connecting said first and second panels.

20. The tonneau system according to claim 19, wherein said at least one of said first panel and said second panel further includes a bottom sheet and a core disposed between said top and bottom sheets.

21. The tonneau system according to claim 20, wherein said core has a honeycomb design.

* * * * *